United States Patent [19]

Trueb et al.

[11] Patent Number: 5,303,730
[45] Date of Patent: Apr. 19, 1994

[54] P-TRAP PROTECTING SYSTEM

[75] Inventors: Steven R. Trueb; Thomas W. Trueb, both of Ellington, Conn.

[73] Assignee: Truebro, Inc., Ellington, Conn.

[21] Appl. No.: 44,026

[22] Filed: Apr. 8, 1993

Related U.S. Application Data

[63] Continuation-in-part of Ser. No. 944,836, Sep. 14, 1992, Pat. No. 5,259,410, which is a continuation-in-part of Ser. No. 754,048, Sep. 3, 1991, Pat. No. 5,163,469, which is a continuation-in-part of Ser. No. 569,995, Aug. 20, 1990, Pat. No. 5,054,513.

[51] Int. Cl.$^5$ .............................. F16L 7/00; F16L 9/22
[52] U.S. Cl. ........................................ 137/375; 285/47; 138/155; 138/158
[58] Field of Search .............. 138/155, 158, DIG. 11, 138/157; 137/247.49, 247.51, 797, 375; 285/47

[56] References Cited

U.S. PATENT DOCUMENTS

| | | | |
|---|---|---|---|
| 124,770 | 3/1872 | Stetson et al. | 285/47 |
| 2,650,180 | 8/1953 | Walker | 154/44 |
| 2,937,662 | 5/1960 | Green | 138/25 |
| 3,153,546 | 10/1964 | Dunn | 285/13 |
| 3,177,528 | 4/1965 | Flower et al. | 18/36 |
| 3,402,731 | 9/1968 | Marlin | 137/375 |
| 3,559,694 | 2/1971 | Volberg | 138/147 |
| 3,598,157 | 8/1971 | Farr | 138/157 |
| 3,719,209 | 3/1973 | Rush et al. | 138/177 |
| 3,960,181 | 6/1976 | Baur et al. | 138/178 |
| 4,205,105 | 5/1980 | Blundell | 428/36 |
| 4,441,743 | 4/1984 | Steenbergen | 285/21 |
| 4,463,780 | 8/1984 | Schultz et al. | 138/178 |
| 4,669,509 | 6/1987 | Botsolas | 138/178 |
| 4,840,201 | 6/1989 | Botsolas | 138/178 |

FOREIGN PATENT DOCUMENTS

| | | | |
|---|---|---|---|
| 3723394 | 2/1989 | Fed. Rep. of Germany | 285/47 |
| 2538076 | 6/1984 | France | 285/47 |

*Primary Examiner*—A. Michael Chambers
*Attorney, Agent, or Firm*—Ira S. Dorman

[57] ABSTRACT

Thermal insulation for the piping of a sink or the like comprises an elongate tubular piece that is fabricated from a resiliently yieldable material and that has integrally formed, resiliently yieldable internal rib formations projecting into the passageway through which the piping extends. The rib formations enable more universal application to pipes of various sizes, while also affording better insulating and cushioning properties. Angle valve piping insulation includes a hinged cover component that is normally at least substantially closed, and that is readily displaceable to permit access into the internal body passage.

11 Claims, 2 Drawing Sheets

P-TRAP PROTECTING SYSTEM

CROSS-REFERENCE TO RELATED APPLICATION

This application is a continuation-in-part of U.S. application for Letters Pat. Ser. No. 07/944,836, filed Sep. 14, 1992 and now issued as U.S. Pat. No. 5,259,410 which is a continuation-in-part of application for Letters Pat. Ser. No. 07/754,048, filed Sep. 3, 1991 and now issued as U.S. Pat. No. 5,163,469, which is in turn a continuation-in-part of application for Letters Pat. Ser. No. 07/569,995, filed Aug. 20, 1990 and now issued as U.S. Pat. No. 5,054,513.

BACKGROUND OF THE INVENTION

Regulations in place in many municipalities require that the so-called "P-trap" assembly (i.e., the wastewater piping under sinks and the like) be insulated so as to prevent injury from contact with hot metal surfaces. Wheelchair bound individuals are at particular risk.

The required thermal insulation may be supplied by wrapping or otherwise applying lengths of insulation (such as of foam rubber and the like) about the pipes. Such practices are however undesirable for a number of reasons: application is often difficult and time-consuming; the applied insulating material tends to become disoriented and displaced; the finished installation is typically unaesthetic; and often the result is simply ineffective.

The prior art suggest a wide variety of pipe covering techniques and structures. For example, Far et al U.S. Pat. No. 3,598,157 discloses preformed covering pieces made of foamed plastics and configured for various pipe fittings. Blundell U.S. Pat. No. 4,205,105 shows an elongated pipe-insulating structure that is axially slit along one side, and Martin U.S. Pat. No. 3,402,731 provides foamed insulating sleeves for pipe elements.

U.S. Pat. Nos. 2,650,180, 2,937,662, 3,153,546, 3,559,694, 4,441,743 and 4,840,201, to Walker, Green, Dunn, Volberg, Steenbergen and Botsolas, respectively, all show encased insulating structures applied to pipes and fittings; U.S. Pat. Nos. 3,960,181, 4,463,780 and 4,669,509, to Baur et al, Schultz et al and Botsolas, respectively, provide one-piece covering wrappings fabricated from flexible plastic materials; and U.S. Pat. Nos. 3,177,528 and 3,719,209, to Flower et al and Rush et al, respectively, are directed to electrically insulated coatings for pipe fittings and to extruded plastic plumbing traps.

Despite the activity in the art indicated by the foregoing, there has been a need for means by which under-sink piping can quickly, easily, and inexpensively be thermally insulated. Although Applicants' U.S. Pat. Nos. 5,054,513 and 5,163,469, and their copending application Ser. No. 07/944,836, provide thermal insulation systems and installations by and in which the foregoing needs are well satisfied, it would of course be desirable to provide improvements in the fit, insulation effects, and convenience of use of such articles of insulation.

SUMMARY OF THE INVENTION

Accordingly, it is a broad object of the present invention to provide novel thermal insulation for the piping of a sink or the like, which insulation is adapted to afford a good fit upon piping within a range of sizes, as well as enhanced insulating and cushioning properties.

Another object of the invention is to provide such insulation, including a piece for the angle valve piping that enables ready access to the valve-operating handle.

More specific objects of the invention are to provide such insulation which is of relatively simple and inexpensive construction, and is quick and easy to employ.

It has now been found that certain of the foregoing and related objects of the invention are attained by the provision of thermal insulation comprising a multiplicity of elongate tubular pieces fabricated from a resiliently yieldable material having thermal insulation properties, each piece having opposite ends and defining an internal passageway for the receipt of a piping section. A first one of the pieces is substantially J-shaped, a second one is substantially straight, and a third is substantially L-shaped; each has a multiplicity of resiliently yieldable rib formations integrally formed on its inside surface and extending into its passageway.

A fourth insulating piece comprises a tubular body that includes a valve handle-covering portion at one end, a pipe-covering portion at the other end, and a valve body-covering portion therebetween. Structure on the valve body-covering portion defines a secondary passage for a water supply tube, extending along an axis generally perpendicular to the longitudinal axis of the tubular body, and an integrally formed cover component closes the primary passage at the "one" end of the tubular body. The cover component is joined to the upper portion of the tubular body by a hinge element, and a line of weakness may be provided to enable facile displacement and ready access into the handle-covering portion.

Other objects of the invention are attained by the provision of thermal insulation comprising at least one integrally formed elongate tubular piece having resiliently yieldable internal rib formations, and by the provision of thermal insulation for the angle valve piping per se of a sink or the like, both as hereinabove and hereinbelow described. The passageway through all of the insulation pieces will normally be of circular cross section, and the formations will advantageously be spaced along the length of the passageway; they may extend circumferentially, and may be of semiannular configuration. End portions of the insulation pieces will desirably be dimensioned to telescopically engage one another with the pieces disposed in an end-to-end arrangement, and they will normally be slit to permit spreading of the contiguous marginal portions, for facile installation. Laterally aligned apertures formed in the marginal portions will usually be spaced along the slit for the receipt of fasteners; the apertures will preferably extend tangentially, relative to the circumference of the passageway through the insulating piece, and the aperture-forming structure will desirably lie in substantial radial registry with the rib formations.

DETAILED DESCRIPTION OF THE ILLUSTRATED EMBODIMENTS

Figure 1:
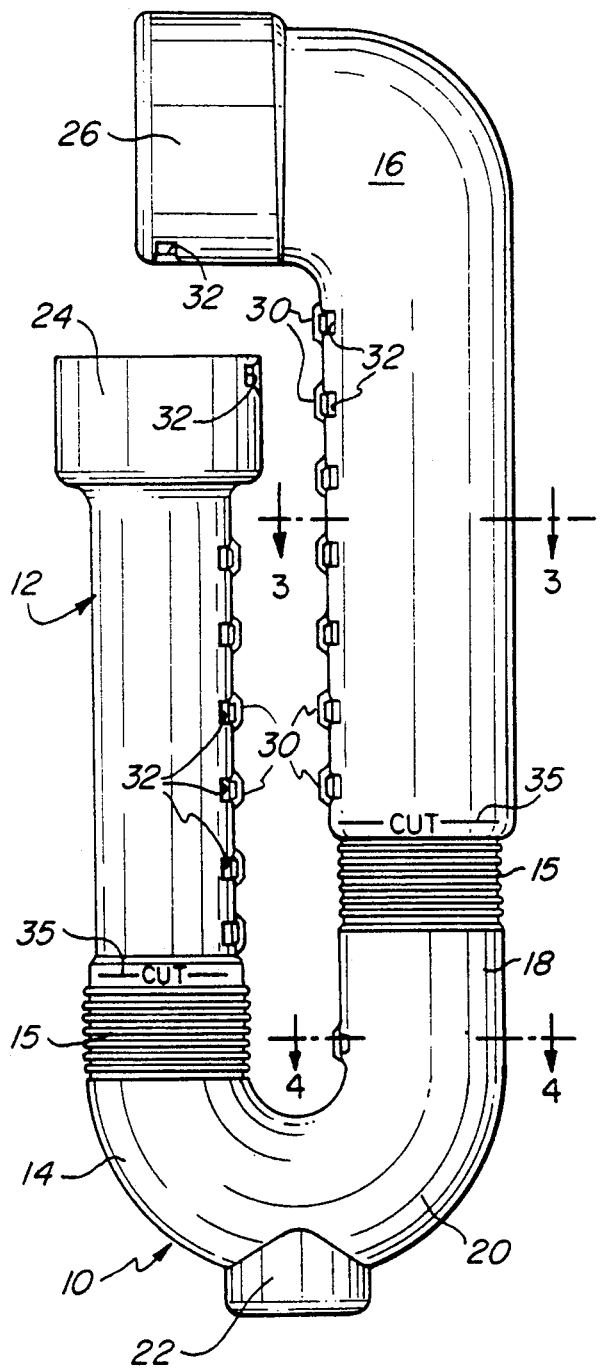
FIG. 1 is an elevational view of an article comprising the thermal insulation of the present invention.

FIG. 1 of the drawings illustrates a unitary article, molded from a resiliently yieldable, rubbery, thermally insulating material, and comprising three sections from which insulating pieces embodying the invention are produced. More particularly, the article is of generally circular cross section throughout its entire length, and includes a substantially J-shaped tubular section, generally designated by the numeral 10, a substantially straight tubular section generally designated by the numeral 12 and connected to the longer leg 18 of the section 10, and a substantially L-shaped section generally designated by the numeral 16 and connected to the shorter leg 14 of the section 10; the sections 10, 12 and 16 are demarcated by the "CUT" lines 35. Collar portions 24 and 26 are provided on the free end portions of the straight section 12 and the L-shaped section 16, respectively, and the toric portion 20 of the J-section 10 is formed with a circular protrusion 22.

Figure 3:
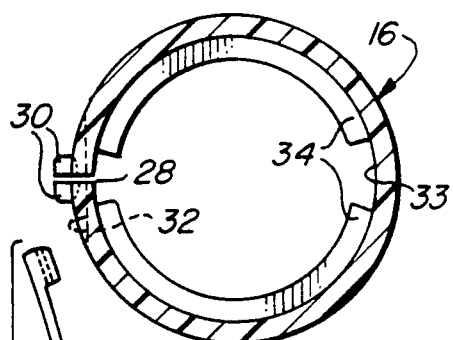
FIG. 3 is a sectional view taken along line 3—3 of FIG. 1.
Figure 4:
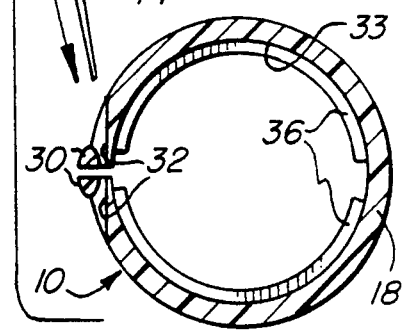
FIG. 4 is a sectional view taken along line 4—4 of FIG. 1.

Although not visible in FIG. 1, the article is slit continuously along its inner periphery, to provide longitudinal slits 28 in the several sections. Aligned slot portions 32 are formed through bosses 30 on the marginal portions contiguous to the slits 28, which provide slots that extend generally tangentially to the internal circumferential surface defining the passageway 33 through the article; these features are best seen in FIGS. 3 and 4. As is also seen therein, substantially semiannular rib elements 34 and 36 project into the passageway 33 from the inside surfaces on the sections 16 and 10, respectively (similar rib elements 31 are provided within the section 12).

Figure 5:
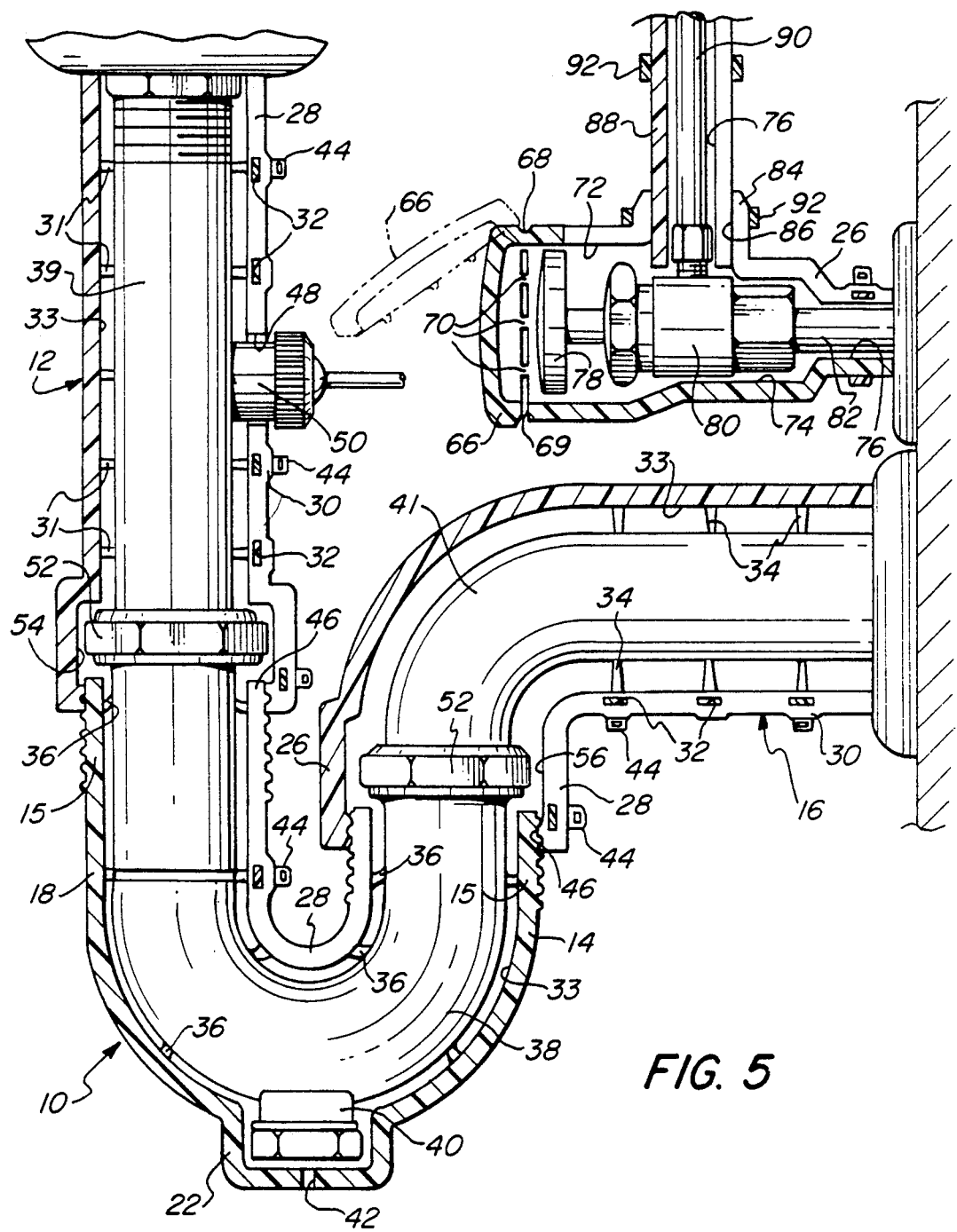
FIG. 5 is an elevational view depicting undersink piping upon which is installed thermal insulation (shown in section) embodying the invention.

As depicted in FIG. 5, the article has been converted into three pieces by cutting it at the locations 35, and the pieces (designated by the numerals of the sections to which they correspond) are assembled in an end-to-end arrangement on the undersink, P-trap assembly illustrated. The piping consists of a J-bend 38, covered by the piece 10, a tail piece 39 covered by the piece 12, and a waste arm 41 covered by the piece 16. Pipes 38, 39 and 41 are joined to one another by standard coupling nuts 52, which are accommodated within the spaces 54, 56 defined respectively by the collar portions 24 and 26. As will be noted, the collar portions are formed with internally corrugated entrance structure 46, which cooperates with the corrugated end portions 15 on both legs 14 and 18 of the piece 10 for enhanced interengagement. The insulation sections 10, 12 and 16 are secured in place by conventional ratchet-acting plastic bands or fasteners 44 (used for example for electrical wire bundling), which are threaded through the aligned tangential slot portions 32 and tightened about the overlying bosses 30.

As will be noted, in receiving the pipes certain of the internal ribs 31, 34, 36 have become slightly distorted, while others have maintained substantially their as-molded shape. This serves of course to permit the insulation to accommodate and closely fit the piping, despite variations in its dimensions and configurations, and it permits fabrication of somewhat oversize parts, for more universal application. The ribs also serve to keep the main body (i.e., sidewall) of the insulation out of direct contact with the piping, thereby increasing its thermal insulating value as well as affording enhanced physical cushioning effects.

The clean-out nut and associated structure 40 on the J-bend 38 are accommodated within the well that is formed by the protrusion 22 on the toric portion 20 of the piece 10, which protrusion can simply be cut away when access to the clean-out structure 40 is required; the weep hole 42 in the protrusion 22 serves to prevent the buildup of water due to possible leakage within the system. It will be noted that a circular opening 48 has been cut along the slit 28 in the piece 12, for the purpose of accommodating the projecting pop-up valve structure 50 on the tail piece 39. It will also be noted that the paired apertures 32 are in radial registry with one of the ribs 31, 34 or 36, as is desirable from the standpoint of providing underlying support against tightening of the fastening bands, and that they are located on the inwardly directed (or otherwise obscured) portions of the installed insulation; this not only makes them less obtrusive from an aesthetic standpoint, but it also makes the fastners (which may have sharp or ragged edges after trimming) less accessible for injurious contact.

Figure 2:
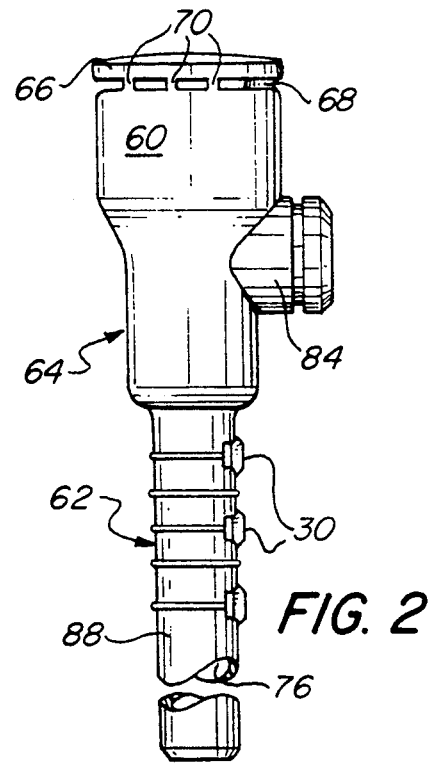
FIG. 2 is a fragmentary elevational view of an insulating piece for covering angle valve piping and an associated water supply tube.

With added reference now to FIG. 2, the insulating piece shown therein consists of an elongate tubular body that includes a valve handle-covering portion at one end, a pipe-covering portion at the other end, and an intermediate valve body-covering portion, which portions are generally designated respectively by the numerals 60, 62 and 64. As is best seen in FIG. 5, a primary passage extends along the longitudinal axis of the insulating piece; it consists of a relatively large section 72 at one end, for the containment of the handle 78 and associated structure of the angle valve, a smaller adjacent section 74 for the containment of the valve body 80, and a still smaller opposite end section 76 for receipt of the water inlet pipe 82.

Cover compoent 66 is integrally formed with the body of the insulation, and is attached thereto by a hinge element 68. A circumferential slot 69 extends from the ends of the hingle element 68 and substantially surrounds the cover component 66, the slot 69 being interrupted by a number of nips or weak connecting elements 70 at spaced locations therealong. When access to the valve handle 78 is desired, the cover component 66 can readily be displaced (e.g., to the phantom-line position of FIG. 5) by pivoting it away from the main body portion on the hinge element 68, easily tearing the connecting elements 70. Because the hinge element 68 is positioned at the top of the insulation, as installed, the cover component 66 will of course inherently assume a substantially closed position in the absence of lifting force.

Collar structure 84, also formed at the top of the insulation (along the slit 26), defines a secondary passage 86 into the tubular body; it is of circular cross section, and has a diameter substantially the same as the outside diameter of the pipe-covering portion 62. To complete the installation, the portion 62 is cut at an appropriate point along its length (as dictated by the spacing of the valve body from the wall structure), thus producing a separate piece 88. The piece 88 is placed over the water supply tube 90 with its lower end portion inserted into the secondary passage 86, and is secured in place with a surrounding plastic band 92.

Although the drawings and the corresponding parts of the specification describe the best mode contemplated for carrying out the invention, it will be understood that variations can be made without departing from the novel concepts hereof. For example, the ribs formed within the insulation pieces need not extend circumferentially, but may instead be longitudinal, helical, in a crisscross pattern, or the like; they may be of either substantially continuous length (e.g., semicircular) or quite short and discrete, and they may of course vary in height (radial length) and shape. The insulating pieces will normally be fabricated from a synthetic elastomeric material such as polyurethane, polyvinyl chloride, or a silicon rubber, so as to provide the desired resiliency for facile installation as well as a suitable thermal conductivity value, good cushioning effects, and other desired properties. The material used may have a foamed structure and any desired coloration, and the insulation will typically have a nominal wall thickness ranging from ⅛ inch to ½ inch, with ¼ inch often providing a most desirable balance of functional properties and cost factors. A complete P-trap insulating system may conveniently be produced as a one-piece article, using any molding technique that may be appropriate under the circumstances, or each piece may be produced individually if so desired. Alternatives to the plastic fastening bands described will occur to those skilled in the art, and it will be appreciated that the system can be used to insulate piping of plastic as well as of metal.

Thus, it can be seen that the present invention provides novel thermal insulation for the piping of a sink or the like, which insulation is adapted to afford a good fit upon pipes within a range of sizes, as well as affording enhanced insulating and cushioning properties. The angle valve piping piece enables ready access to the valve-operating handle, and the insulation itself is of relatively simple and inexpensive construction, and is quick and easy to employ.

What is claimed is:

1. Thermal insulation for the piping of a sink or the like, comprising at least one elongate tubular piece of generally circular cross section fabricated from a resiliently yieldable material having thermal insulation properties, said piece having opposite ends and defining an internal passageway, from end-to-end therethrough, for the receipt of a piping section, said piece also having a multiplicity of integrally formed, resiliently yieldable rib formations projecting from the inside surface thereof inwardly into said passageway, said piece being slit along its length to permit spreading of marginal portions therealong, and having aperture-forming structure spaced along said slit for the receipt of fasteners for securing together said marginal portions, said aperture-forming structure providing pairs of laterally aligned apertures spaced along said slit, one aperture of each said pair being provided on each of said marginal portions and said apertures extending generally tangentially relative to the circumference of said passageway.

2. The insulation of claim 1 wherein said rib formations are spaced along the length of said passageway.

3. The insulation of claim 2 wherein said rib formations extend circumferentially about said passageway.

4. The insulation of claim 3 wherein each of said rib formations comprises a semiannular element.

5. The insulation of claim 1 wherein the overall configuration of said piece is selected from the group consisting of substantially J-shaped, substantially straight, and substantially L-shaped.

6. The insulation of claim 5 comprising three of said pieces, one of said pieces having each of said overall configurations of which said group consists.

7. The insulation of claim 6 wherein certain of said opposite ends are dimensioned to telescopically engage one another with said pieces disposed in an end-to-end arrangement.

8. The insulation of claim 1 wherein said rib formations extend circumferentially about said passageway, and wherein each of said pairs of apertures lies in substantial radial registry with one of said rib formations.

9. Thermal insulation for the piping of a sink or the like, comprising a multiplicity of elongate tubular pieces fabricated from a resiliently yieldable material having thermal insulation properties, each of said pieces having opposite ends and defining an internal passageway, from end-to-end therethrough, for the receipt of a piping section, a first one of said pieces being substantially J-shaped, a second one of said pieces being substantially straight, and a third one of said pieces being substantially L-shaped, each of said first, second, and third pieces having a multiplicity of integrally formed, resiliently yieldable rib formations projecting from the inside surface inwardly into said passageway thereof; a fourth one of said pieces comprises a tubular body in which said passageway provides a primary passage along its longitudinal axis, said tubular body including a valve handle-covering portion at one end, a pipe-covering portion at the other end, and a valve body-covering portion therebetween, said valve body-covering portion having an upper portion with structure defining a secondary passage for a water supply tube extending along an axis generally perpendicular to said longitudinal axis, said fourth piece further including an integrally formed cover component closing said primary passage at said one end of said tubular body and joined thereto by connecting structure, including a hinge element connected to said upper portion thereof, said cover component being readily displaceable from said body to permit access into said handle-covering portion thereof, and being inherently returnable to a substantially closed position.

10. Thermal insulation for the angle valve piping of a sink or the like, comprising an elongate tubular body of unitary construction fabricated from a resiliently yieldable material having thermal insulation properties, said body defining a primary passage along its longitudinal axis and having opposite ends with a valve handle-covering portion at one end, a pipe-covering portion at the other end, and a valve body-covering portion therebetween, said valve body-covering portion having an upper portion with structure defining a secondary passage for a water supply tube extending along an axis generally perpendicular to said longitudinal axis, said insulation further including an integrally formed cover component closing said primary passage at said one end of said tubular body and joined thereto by connecting structure, including a hinge element connected to said upper portion thereof, said cover component being readily displaceable from said body to permit access into said handle-covering portion thereof, and being inherently returnable to a substantially closed position.

11. The insulation of claim 10 wherein said connecting structure also defines a line of weakness extending from said hinge element and substantially about said valve handle-covering portion.

* * * * *